Jan. 23, 1940.   E. MIRONE   2,188,246
AUTOMATIC CHANGE SPEED GEAR
Filed Dec. 7, 1937   2 Sheets-Sheet 1

INVENTOR:
Eligio Mirone

By Alexander Dowell
ATTORNEYS

Jan. 23, 1940.  E. MIRONE  2,188,246
AUTOMATIC CHANGE SPEED GEAR
Filed Dec. 7, 1937  2 Sheets-Sheet 2
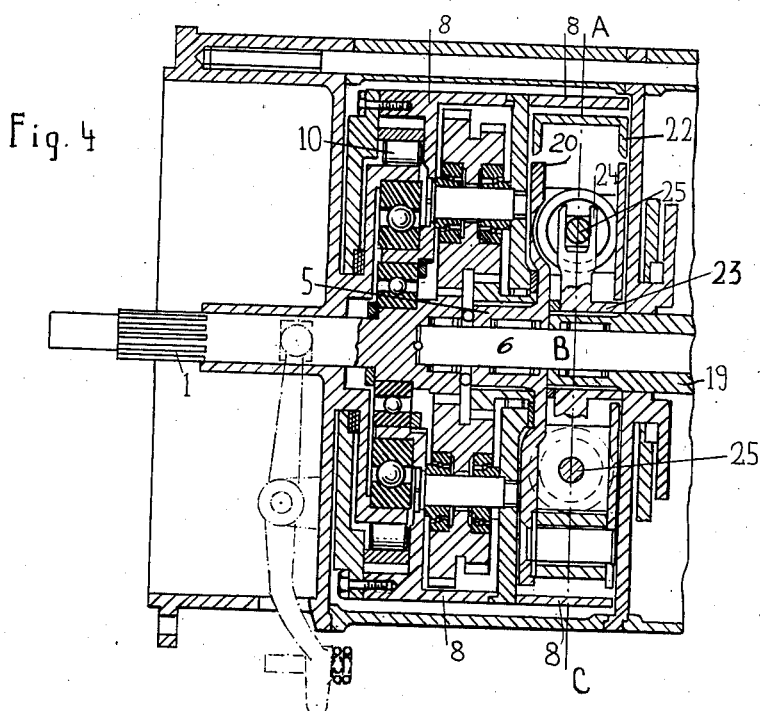
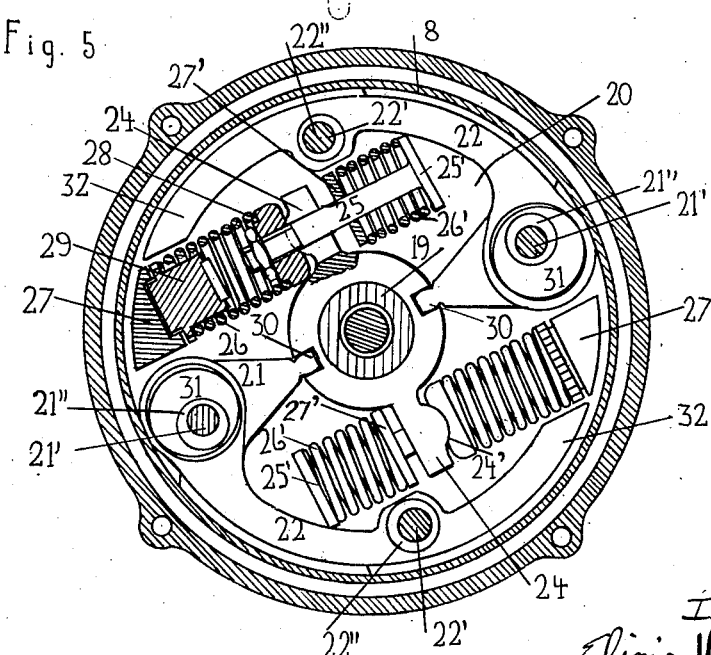

Patented Jan. 23, 1940

2,188,246

UNITED STATES PATENT OFFICE 2,188,246

AUTOMATIC CHANGE SPEED GEAR

Eligio Mirone, Turin, Italy

Application December 7, 1937, Serial No. 178,607
In Germany May 5, 1937

8 Claims. (Cl. 74—259)

This invention relates to an automatically operating change speed gear of the type comprising one or more planetary gears in tandem and in which the gear change is effected automatically in accordance with the torque to be overcome, by automatically releasing or blocking the planetary wheel carrier of the sun and planet gear, said carrier being held against backward rotation by a one-way brake.

The principal object of this invention is to provide means by which the automatic change speed gear of the above-mentioned type reacts promptly to variations in torque and affords a safe, steady and smooth change in speed.

The accompanying drawings show, purely by way of example and not definitely, two diagrammatic forms of practical embodiments of the invention in which the applicant intends comprising all possible industrial applications for ratios varrying the speed of the driving shaft, as well as the alteration of constructional details, the form, dimensions and materials employed within the spirit and scope of the invention.

Figure 1:
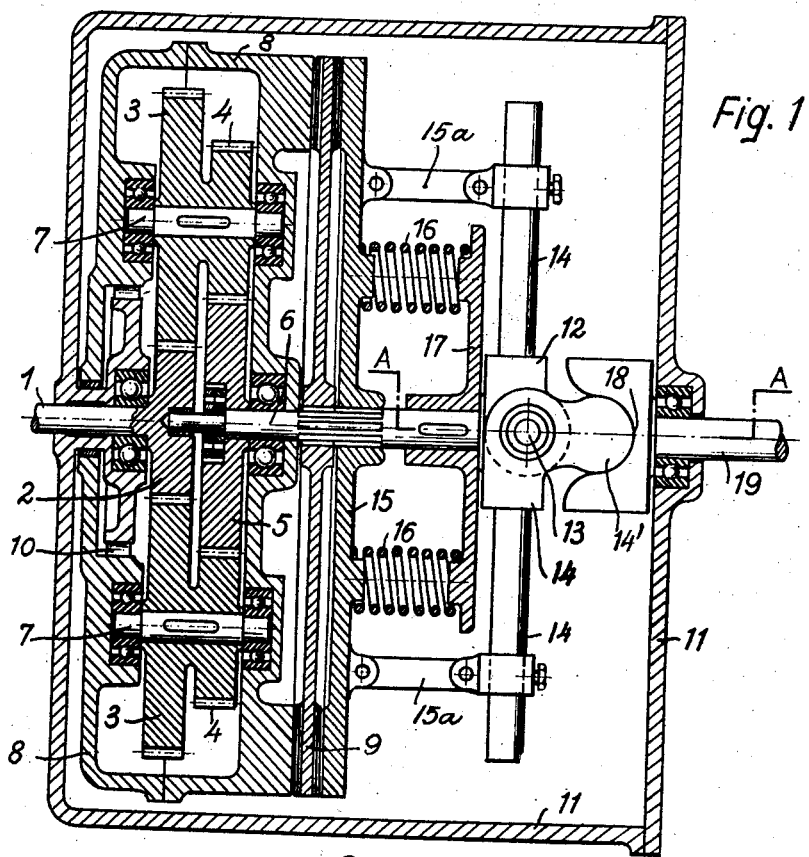
Figure 2:
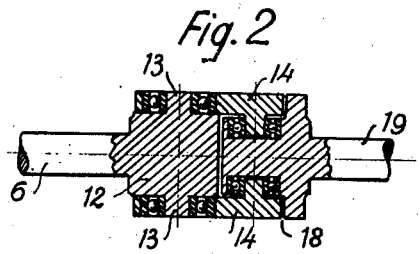
Figure 3:
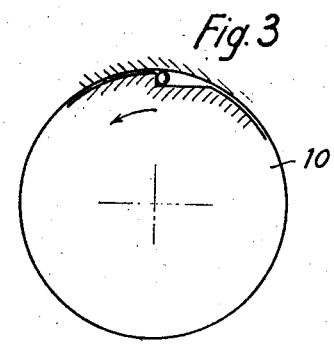

Figs. 1, 2, 3 show one embodiment, in which Fig. 1 is an axial longitudinal section through a two speed change gear; Fig. 2 is a section along the line A—A of Fig. 1; Fig. 3 is a schematic detail showing the free wheel arrangement.

Figs. 4 and 5 show a second embodiment (described and illustrated in the application for the Italian patent filed the 24th of August 1937 under No. 76,128) in which the casing is locked to the driven part through a spring controlled arrangement combined with a jaw instead of a disc friction clutch, and in which Fig. 4 is a longitudinal section through a change speed gear showing only the first group corresponding to two different speed ratios; and Fig. 5 is a transverse section through the friction clutch on the line A—B—C.

In the first embodiment (Figs. 1, 2, 3) 1 is the driving shaft on which is solidly mounted a gear wheel 2 directly meshing with a pair of diametrically disposed reduction gears 3, 3, connected axially with gear wheels 4, 4 which are in mesh with a gear wheel 5 keyed to the driven shaft 6 in alignment with the driving shaft. The two pairs of gear wheels 3 and 4 are further fixedly mounted to their respective shafts 7, which are rotatably mounted in the casing 8. The shaft 6, at its end adjacent the transmission, terminates in a head 12 provided on each side with pins 13 on which are mounted two oscillating levers 14 opposite each other, which rotate together with the said shaft 6. A friction clutch is provided for coupling the driven shaft 6 with the casing 8, said clutch comprising a clutch plate 9, and a pressure disc 15 keyed on the drive shaft 6, compression springs 16 being disposed between disc 15 and a plate 17 fixed on the shaft 6 for yieldably maintaining the clutch plate 9 engaged with the adjacent face of the casing 8. The discs 9 and 15 are slidable axially of shaft 6. The two opposed oscillating levers 14 are connected with the clutch pressure disc 15 by means of links 15a. Each of the two levers 14 includes a tail-piece 14', said tail-pieces having opposed radial pins and roller bearings (Fig. 2), the pins entering opposed cavities formed in the sides of transverse head 18 of the transmission shaft 19.

The operation is as follows:

The change speed gear being put in motion, the rotating driving shaft 1 causes the whole arrangement to revolve, i. e., the train of planetary gears 3, 4, with their casing 8, the latter being connected to the driven shaft 6 by means of the friction clutch. The tail-pieces 14' of the levers 14 tend to rotate the transmission shaft 19, but when encountering a resistance higher than the driving torque, the pieces 14', and consequently the levers 14, oscillate on the pins 13 and retract the clutch pressure plate 15, releasing clutch 9 against the action of springs 16. As a reaction to release from the driven shaft 6, casing 8 tends to revolve in the opposite direction from said shaft 6, but is held against such rotation due to the wedging action of dent roller 10 of a one-way brake (Figs. 1 and 3).

Consequently, the transmission shaft 19 is rotated by the tail-pieces 14' with a lower speed ratio, the gears 2, 3, 4 and 5 having been brought into action. However, when the resistance encountered by the said tail-pieces sinks below the driving torque, the springs 16 return the levers 14, 14' to the position shown in Fig. 1, again clutching casing 8 to the driven shaft 6 and restoring the direct drive.

These operations are automatically repeated should the resistance of the transmission shaft again increase above the driving torque.

In the second embodiment, described and illustrated in the application for the complementary Italian patent, the difference between it and the foregoing description lies in the fact that the locking of the casing to the driven member is effected by a spring control arrangement in conjunction with a jaw instead of a friction clutch. The arrangement of this variant is made in order to reduce the bulk of the parts forming the change speed gear.

Neglecting the reduction gear groups, the arrangement of which does not substantially differ from that already described and illustrated in Figs. 1, 2, 3, to the central driven gear 5 is keyed a disc 20 on which are pivoted, through pins 21' and 22', two levers 21 and two shoes 22, which act on the casing 8 and are controlled by said levers 21 in the following manner: to each lever 21 is secured around the pin 21' an eccentric cam 31 which engages an eye provided at the end of the corresponding shoe 22. Oscillation of lever 21 in either direction strongly presses shoe 22 against the casing 8 or withdraws it therefrom, respectively.

To the transmission member 19 is keyed a sleeve 23 which carries two forked appendages 24, with a hemispherical cam 24', in which forks are engaged two studs 25 which are acted upon by the springs 26, 26' themselves resting on the parts 27, 27' secured to the disc 20. Each spring 26 presses on a cap 28, slipped over the stem of the stud 25. More particularly spring 26 rests on ring 29 screwed on to the part 27 and having two slots in its edge adapted to allow of regulating the tension of the spring 26; the spring 26' in its turn is compressed directly between the part 27' fixed to disc 20 and the flat head 25' of the stem 25.

Perpendicular to the appendages 24, in the sleeve 23 are cut two opposed slots in each of which engages the tooth 30 of the two aforementioned levers 21.

The centres of the fulcrums 21', 22' of the levers 21 and of the shoes 22 are so arranged that they can be moved by setting the cams 21'', 22''; this is in order to take up the wear of the clutch lining. The shoes 22 have counterweights 32 which are intended to compensate when necessary for the centrifugal action set up on the aforementioned jaws.

Rotation of the shaft of the central driven wheel 5 is transmitted to the transmission shaft 19 by two ways, (1) over the disc 20, parts 27, 27', springs 26, 26', caps 28, stems 25, forks 24 and sleeve 23; and (2) over disc 20, pins 21', 22', levers 21 (partly also jaws 22) and sleeve 23.

When the transmission shaft 19 offers a resistance equal to the torque transmitted by the driving shaft 1, the springs 26, 26' suitably set will resist compression thus keeping the shoes 22 pressed against the casing 8, so that the relative speeds of the shafts 1 and 19 are the same. When the driven shaft 19 increases its resistance, pressure of the parts 27, 27' of the disc 20 driven by the shaft of the driven wheel 5 of the sun and planet gear produces a greater compression of the springs 26, 26'.

The greater compression of the above mentioned springs sets up a lag behind the sleeve 23 with respect to the disk 20, which through the teeth 30, works the levers 21 pivoted on the pins 21' forming part of the disc 20, retracting the shoes 22 which are pivoted on the studs 22' and freeing the casing which will tend to revolve in the opposite direction, but will be stopped by the one way brake 10, thus attaining the reduction of speed through the satellite gears with increase of ultimate torque.

In the construction described and shown in Figs. 4 and 5 the strong multiplication with which springs 26, 26' press the shoes 22 against the casing 8 should be remarked. It is obvious that change of speed takes place gradually and smoothly.

The change speed gear illustrated and described is arranged for two different speed ratios. It is however clear that by fitting a second apparatus in tandem with the first four speeds can be obtained, that is, three geared speeds and direct drive, and thus several change speed gears can be fitted according to the number of speeds desired. In such case it will be sufficient to vary the tension of the springs and the ratio of the gear wheels.

I claim:

1. An automatic change speed gear, comprising three aligned shafts; a sun and planet gear including a driving member connected to the first shaft, a driven member connected to the second shaft, and a reaction member; a one-way brake for said reaction member; clutch means between said reaction member and the second shaft for bodily rotating the sun and planet gear; means for yieldably holding the clutch means engaged; levers operatively connected to the clutch means and articulated to the second shaft and connected with the third shaft for rotating the third shaft therewith; whereby lagging of rotation of the third shaft behind that of the second shaft will rock the levers and disconnect said clutch means, and the one-way brake will hold the reaction member against rotation and permit the sun and planet gear to operate.

2. An automatic change speed gear comprising three aligned shafts; a sun and planet gear including a driving member connected to the first shaft, a driven member connected to the second shaft, and a reaction member; a one-way brake for said reaction member; clutch means between said reaction member and the second shaft for bodily rotating the sun and planet gear; levers operatively connected to the clutch means and articulated to the second shaft and connected with the third shaft for rotating the third shaft therewith; spring means tending to maintain a relative position between the second and third shafts and to hold the clutch means in engagement; whereby lagging of rotation of the third shaft behind that of the second shaft will rock the levers and disconnect said clutch means, and the one-way brake will hold the reaction member against rotation and permit the sun and planet gear to operate.

3. An automatic change speed gear comprising three aligned shafts; a sun and planet gear including a driving member connected to the first shaft, a driven member connected to the second shaft, and a reaction member; a one-way brake for said reaction member; clutch means including expanding members articulated to the second shaft between the reaction member and said second shaft for bodily rotating the first and second shafts and the sun and planet gear; levers hinged to the second shaft and engaged by the third shaft, whereby lagging in rotation of the third shaft with respect to the second shaft will rock the levers; cams actuated by said levers and coacting with said expanding members; whereby rocking movement of the levers will disconnect said clutch means; and spring means tending to normally maintain the second and third shafts in such position that the levers will maintain the expanding members in their operative position; said one-way brake maintaining the reaction member against rotation when the clutch means is disconnected thereby permitting the sun and planet gear to function.

4. In an automatic change speed gear as set forth in claim 3, said spring means, levers and expanding members being arranged about the common axis of said three shafts in a plane transverse to said axis, and said levers and expanding members being pivoted upon axes parallel to said common axis.

5. In an automatic change speed gear as set forth in claim 3, means for adjusting the axes of oscillation of the levers and expanding members.

6. In an automatic change speed gear as set forth in claim 3, means for adjusting the tension of the clutch means.

7. In an automatic change speed gear as set forth in claim 3, the expanding members comprising friction jaws provided with counterweights for balancing centrifugal force.

8. In an automatic change speed gear, the combination with a driving shaft, a driven shaft and transmission shaft; a sun and planet gear including a driven member connected to the driving shaft, a driven member connected to the driven shaft, and a reaction member; a one-way brake for said reaction member; clutch means between said reaction member and the driven shaft for bodily rotating the sun and planet gear; of spring means for yieldably holding the clutch means engaged; lever members rotating with the driven shaft and adapted to disengage the clutch means; and arms on the transmission shaft for operating said lever members when the speed of the transmission shaft decreases below the speed of the driven shaft, whereby the clutch means will be disconnected and the one-way brake will hold the reaction member against rotation while permitting the sun and planet gear to operate.

ELIGIO MIRONE.